US012663212B2

(12) United States Patent
Tockert et al.

(10) Patent No.: US 12,663,212 B2
(45) Date of Patent: Jun. 23, 2026

(54) METHOD FOR OPERATING A BLAST FURNACE PLANT

(71) Applicant: PAUL WURTH S.A., Luxembourg (LU)

(72) Inventors: Paul Tockert, Berbourg (LU); Lutwin Franziskus, Wochern (DE); Roger Ries, Greisch (LU); Marc Schon, Biwer (LU); Marc Schweitzer, Mamer (LU)

(73) Assignee: PAUL WURTH S.A., Luxembourg (LU)

( * ) Notice: Subject to any disclaimer, the term of this patent is extended or adjusted under 35 U.S.C. 154(b) by 419 days.

(21) Appl. No.: 18/271,927

(22) PCT Filed: Jan. 20, 2022

(86) PCT No.: PCT/EP2022/051185
§ 371 (c)(1),
(2) Date: Jul. 12, 2023

(87) PCT Pub. No.: WO2022/157221
PCT Pub. Date: Jul. 28, 2022

(65) Prior Publication Data

US 2024/0077255 A1 Mar. 7, 2024

(30) Foreign Application Priority Data

Jan. 20, 2021 (LU) ........................................ 102438

(51) Int. Cl.
*F27B 1/20* (2006.01)
*C21B 7/10* (2006.01)
(Continued)

(52) U.S. Cl.
CPC .................. *F27B 1/20* (2013.01); *C21B 7/10* (2013.01); *C21B 7/18* (2013.01); *F27D 3/10* (2013.01);
(Continued)

(58) Field of Classification Search
CPC ..... F27B 1/20; C21B 7/10; C21B 7/18; C21B 2100/64; C21B 5/06; C21B 7/002;
(Continued)

(56) References Cited

U.S. PATENT DOCUMENTS 3,780,890 A 12/1973 Glover
4,071,166 A * 1/1978 Legille ...................... C21B 7/20 414/202
(Continued)

FOREIGN PATENT DOCUMENTS

EP 0228619 * 7/1987 ............... C21C 5/35
JP S49117308 U 10/1974
(Continued)

OTHER PUBLICATIONS

KR-20120020410, Jeon et al., Gas Circulation Blast Furnace for Pressure Equalizing of Top Hopper, Mar. 8, 2012 (Year: 2012).*
(Continued)

*Primary Examiner* — Jessee R Roe
*Assistant Examiner* — Michael Aboagye
(74) *Attorney, Agent, or Firm* — CANTOR COLBURN LLP

(57) ABSTRACT

A method for operating a blast furnace plant that includes a blast furnace, at least one material hopper for charging raw materials to the blast furnace, having a upper seal valve and a lower seal valve, and at least one hot stove that produces hot blast for the blast furnace, the method including at least one charging cycle with the following steps: opening the upper seal valve, introducing raw materials into the material
(Continued)

hopper, closing the upper seal valve, pressure equalization of the material hopper with blast furnace top pressure, and opening the lower seal valve to discharge raw materials into the blast furnace, wherein, in order to provide a cost-effective way to minimize the explosion danger during operation of a top charging system, an offgas from the at least one hot stove is transferred by a transfer system to the at least one material hopper and, before the lower seal valve is opened, the offgas is injected into the material hopper.

14 Claims, 2 Drawing Sheets

(51) Int. Cl.

| | |
|---|---|
| ***C21B 7/18*** | (2006.01) |
| ***F27D 3/10*** | (2006.01) |
| ***F27D 17/00*** | (2025.01) |
| ***F27D 17/10*** | (2025.01) |
| ***F27D 17/30*** | (2025.01) |
| *F27D 17/13* | (2025.01) |

(52) U.S. Cl.
CPC ............. *F27D 17/10* (2025.01); *F27D 17/30* (2025.01); *F27D 2003/105* (2013.01); *F27D 17/13* (2025.01)

(58) Field of Classification Search
CPC . C21B 7/007; F27D 3/10; F27D 17/10; F27D 17/30; F27D 17/13; F27D 2003/105
USPC ........................................... 266/44, 197, 184
See application file for complete search history.

(56) References Cited

U.S. PATENT DOCUMENTS

| | | | | |
|---|---|---|---|---|
| 4,315,619 | A * | 2/1982 | Inoue | C21B 7/007 266/89 |
| 8,512,439 | B2 * | 8/2013 | Loutsch | C10G 1/10 95/96 |
| 8,845,778 | B2 * | 9/2014 | Loutsch | C21B 7/002 75/469 |

FOREIGN PATENT DOCUMENTS

| | | | | | |
|---|---|---|---|---|---|
| JP | S57185908 | | * | 11/1982 | C21B 7/007 |
| JP | S57185908 | A | | 11/1982 | |
| KR | 20040010889 | A | | 2/2004 | |
| KR | 1020050051022 | A | | 6/2005 | |
| KR | 20120020410 | A | * | 3/2012 | C21B 7/002 |
| KR | 20180073991 | A | | 7/2018 | |
| LU | 92316 | B1 | | 5/2015 | |
| WO | 2010124980 | A1 | | 11/2010 | |
| WO | 2016026869 | A1 | | 2/2016 | |

OTHER PUBLICATIONS

JPS57185908, Yamaguchi, Equalizing Method Fo Top Pressure of Blast Frunace, Description, Nov. 16, 1982 (Year: 1982).*
JPS57185908, Yamaguchi, Equalizing Method Fo Top Pressure of Blast Frunace, Abstract, Nov. 16, 1982 (Year: 1982).*
Japanese Patent Office in the corresponding Japanese application No. 2023- 543307; Dated Aug. 21, 2025.
International Preliminary Report on Patentability for corresponding application PCT/EP2022/051185 filed Jan. 20, 2022; Mail date May 3, 2023.
International Search Report for corresponding application PCT/EP2022/051185 filed Jan. 20, 2022; Mail date May 9, 2022.
Written Opinion for corresponding application PCT/EP2022/051185 filed Jan. 20, 2022; Mail date May 9, 2022.

* cited by examiner

METHOD FOR OPERATING A BLAST FURNACE PLANT

TECHNICAL FIELD

The disclosure relates to a method for operating a blast furnace plant and to a blast furnace plant.

BACKGROUND ART

Despite alternative methods, like scrap melting or direct reduction within an electric arc furnace, the blast furnace today still represents the most widely used process for steel production. One of the concerns of a blast furnace installation is the blast furnace gas exiting the blast furnace. Since this gas exits the blast furnace at its top, it is also commonly referred to as "top gas". One component in the blast furnace gas is $CO_2$, which is environmentally harmful and is mainly useless for industrial applications. The blast furnace gas exiting the blast furnace may comprise a concentration of $CO_2$ as high as 20% to 30% in volume (v/v). Apart from this, the blast furnace gas usually comprises considerable amounts of $N_2$, CO, $H_2O$ and $H_2$.

In the context of the reduction of $CO_2$ emissions, efforts are being made to reduce the usage of carbonaceous fuels for the operation of a blast furnace. As a replacement, fuels with increased hydrogen concentrations are used. Further, a fuel like coke oven gas can also be used as a reducing gas for the iron ore. However, it is not possible to completely oxidize the reducing gas, which leads to significant amounts of hydrogen gas in the reaction product. This also increases the $H_2$ concentration in the area of the blast furnace top, where the material hopper(s) of the top charging system are located. On modern blast furnaces, the material hopper(s) normally have a volume between 40 up to 120 $m^3$. As raw materials are charged into the material hopper, ambient air is also introduced and mixes with blast furnace top gas, leading to a gas mixture containing significant amounts of oxygen (from ambient air) and hydrogen (from the top gas). The resulting mixture may be combustible or even explosive, posing a high safety risk for the operation of the top charging installation. In order to avoid such risk, it has been proposed to inject $N_2$ (or an $N_2$-rich gas mixture) into the material hopper together with the burden material or immediately afterwards. While such an inertization with nitrogen is effective, it leads to a high consumption of $N_2$ that cannot be recovered or reused. Therefore, the operation expenses for the blast furnace plant increase. Also, $N_2$ or an $N_2$-rich gas may not always be available.

BRIEF SUMMARY

The present disclosure provides a cost-effective way to minimize the fire risk and explosion danger during the operation of a top charging system.

In particular, there is provided a method for operating a blast furnace plant that comprises a blast furnace, at least one material hopper for charging raw materials to the blast furnace, having an upper seal valve and a lower seal valve, and at least one hot stove (30) that produces hot blast for the blast furnace. The method comprising at least one charging cycle with the following steps:

- opening the upper seal valve,
- introducing the raw materials into the material hopper,
- closing the upper seal valve and
- opening the lower seal valve to discharge the raw materials into the blast furnace, wherein an offgas from the at least one hot stove is transferred by a transfer system to the at least one material hopper and the offgas is injected into the material hopper before the lower seal valve is opened and the raw materials are discharged into the blast furnace.

There is also provided a blast furnace plant that comprises a blast furnace, at least one material hopper for charging the raw materials to the blast furnace, having an upper seal valve and a lower seal valve, and at least one hot stove adapted to produce hot blast for the blast furnace, the blast furnace plant being adapted to perform at least one charging cycle with the steps of:

- opening the upper seal valve,
- introducing the raw materials into the material hopper,
- closing the upper seal valve, and
- opening the lower seal valve to discharge the raw materials into the blast furnace, wherein the blast furnace plant further comprises a transfer system adapted to transfer an offgas from the at least one hot stove to the at least one material hopper and the blast furnace plant is adapted to inject the offgas into the material hopper before the lower seal valve is opened and the raw materials are discharged into the blast furnace.

The disclosure provides a method for operating a blast furnace plant. The blast furnace plant comprises a blast furnace. Although the method could be applied to the production of other metals like lead or copper, the blast furnace is normally used for producing pig iron. Commonly, the blast furnace has a vertical shaft or furnace proper with an outer wall normally having a refractory lining. It has a top opening through which raw materials are introduced into the shaft and lower openings through which slag and raw metal (e.g. pig iron) are extracted. In the lower part of the blast furnace, the shaft is normally surrounded by an annular bustle pipe, from which a plurality of tuyeres originate. Hot blast is injected into the shaft through the tuyeres. In this context, "hot blast" refers to hot air, but also to other $O_2$-containing gases or gas mixtures, e.g. oxygen-rich air or even (mostly) pure oxygen. Optionally, other solid components (like particulate coal) or gases (like coke oven gas, natural gas or a synthesis gas) can be injected into the shaft either at the tuyere level or at the shaft level (above the tuyere level). The tuyere level corresponds to the melting zone of the blast furnace while shaft level largely corresponds to a reduction zone of the blast furnace, which normally has significantly lower temperatures than the melting zone.

The blast furnace plant further comprises at least one material hopper for charging raw materials to the blast furnace. The raw materials may also be referred to as a charge material or burden material. It is a particulate bulk material which may comprise particles of various sizes. The raw materials may also comprise particles of varying chemical compositions. Therefore, strictly speaking, such a material could be referred to as a material mixture. For sake of simplicity and brevity, the term "material" is used in this context. As will be explained further below, the blast furnace plant normally comprises a plurality of material hoppers for different raw materials. The raw materials may e.g. be iron ore or another iron-bearing material, a fuel or a reducing material like coal, coke, carbonaceous material, wood, charcoal, or a mixture thereof.

The material hopper, which may also be referred to as a lock hopper, comprises an upper seal valve and a lower seal valve. It will be understood that the upper seal valve, which could also be referred to as a top seal valve, is disposed at or near the upper end of the material hopper, while the lower seal valve, which could also be referred to as a bottom seal valve, is disposed at or near the lower end of the material hopper. Each seal valve is adapted to sealingly close an opening of the material hopper. Correspondingly, the hopper comprises an upper opening through which it receives raw materials and a lower opening through which the raw materials are discharged to the blast furnace. The respective seal valve provides a gas-tight seal, although minor amounts of gas leakage through the seal valve are acceptable. In addition to the upper and lower seal valve, the hopper may comprise a lower material gate. The function of this material gate is not to provide a gas-tight seal, but to regulate the flow of the raw materials through the lower opening into the blast furnace. The at least one material hopper is normally part of a so called "Bell-Less Top" charging system of the blast furnace plant.

The blast furnace plant further comprises at least one hot stove that produces hot blast for the blast furnace. As mentioned above, "hot blast" may in this context be any heated $O_2$-containing gas, normally hot air. The hot stove, which may also be referred to as a hot blast stove, Cowper stove or Cowper, is a regenerative heat exchanger or regenerator, which is heated during a firing phase or heating phase and stores heat which is then transferred to cold blast (i.e. cold air or another $O_2$-containing gas) during a blowing phase or blasting phase. As will be explained below, the blast furnace plant normally comprises a plurality of hot stoves, which may alternatingly go through a respective blowing phase in order to provide a more or less constant supply of hot blast to the blast furnace. During the heating phase, a fuel gas is burnt to generate heat which is then (partially) stored by the hot blast stove (normally by checker bricks inside the stove). The combustion of the fuel gas produces an offgas, which often has a negligible heating value or caloric value and in particular a very low $O_2$ concentration. However, its elevated temperature can be utilised to transfer heat in a heat exchanger. In prior art, the offgas is normally released to the environment, e.g. through a chimney of the blast furnace plant.

The proposed method comprises at least one charging cycle. Normally, a plurality of charging cycles are performed sequentially. Each charging cycle refers to one material hopper. If, as usual, the blast furnace plant comprises a plurality of material hoppers, the charging cycles of different material hoppers may be performed sequentially and/or simultaneously. Each charging cycle comprises the following steps: opening the upper seal valve, introducing the raw materials into the material hopper, closing the upper seal valve, pressure equalizing the material hopper with blast furnace top pressure and opening the lower seal valve to discharge the raw materials into the blast furnace. It is understood that the raw materials are introduced through the above-mentioned upper opening that is associated with the upper seal valve and is discharged into the blast furnace through the above-mentioned lower opening that is associated with the lower seal valve. It will be noted that these steps are normally performed in the sequence in which they are mentioned, so that at any time during the charging cycle, at least one of the seal valves is closed. Although not mentioned above, it will be understood that before opening the upper seal valve, the pressure in the material hopper is relieved to the atmosphere. Further, the upper seal valve is opened while the lower seal valve is closed, wherefore the lower seal valve is closed for the next charging cycle when the raw materials have been discharged to the blast furnace. Thus, a free gas exchange between the blast furnace and the environment through the material hopper is prevented at any time. Since the blast furnace is normally operated at an overpressure with respect to the environment, blast furnace gas would otherwise escape in an uncontrolled manner to the outside.

It will be appreciated that there may be a considerable time interval between the closing of the upper seal valve and the opening of the lower seal valve, during which the raw materials are stored inside the material hopper. Also, the lower seal valve could be opened and closed several times to repeatedly discharge the raw materials before the upper seal valve is opened again to introduce new raw materials into the material hopper.

According to the disclosure, an offgas from the at least one hot stove is transferred by a transfer system to the at least one material hopper and, before the lower seal valve is opened, the offgas is injected into the material hopper. The transfer system is adapted to transfer the offgas from the hot stove to the material hopper. In the simplest case, the transfer system could comprise a single pipe connecting the hot stove to the material hopper, but it will be understood that for a controlled, efficient transfer, additional elements are necessary, some of which will be discussed below. The offgas is of course a gas (or gas mixture) that results from the above-mentioned combustion during the heating phase of the hot stove. It is within the scope of the disclosure that the offgas is combined or mixed with other gases before or while it is injected into the material hopper. Since the offgas results from a combustion, it generally has a low $O_2$ concentration, which may even be negligible. Insofar, the offgas can be regarded as an inert gas. By introducing the offgas into the material hopper, the $O_2$ concentration can be significantly lowered and, ideally, the inside of the material hopper can be inertized. Therefore, when the lower seal valve is opened and the gas from the inside of the material hopper mixes with a blast furnace gas originating from the blast furnace, the risk of forming an explosive mixture is significantly reduced. This particularly applies to a situation in which the blast furnace gas comprises a considerable amount of $H_2$, which could form an explosive mixture with $O_2$ (commonly referred to as "Oxyhydrogen" or "Knallgas").

It is greatly beneficial about the proposed method that a gas that is available in abundance due to the normal operation of the blast furnace plant is utilised as an inert gas. Since the offgas is available in large quantities and without additional costs, effective and cheap inertization of the material hopper can be achieved.

Depending on various factors like the composition of the offgas and the composition of the blast furnace gas, a partial inertization of the material hopper may be sufficient. It is preferred though, that the offgas is injected to constitute preferably above 50% v/v of a gas inside the material hopper when the lower seal valve is opened. In other words, the original atmosphere in the material hopper has been replaced preferably above 50% v/v with the offgas before the lower seal valve is opened. If, for instance, the original atmosphere in the material hopper consists of air having an $O_2$ concentration of approximately 21% v/v, and the air is replaced by 70% v/v with an offgas that is more or less $O_2$-free, the resulting gas mixture has an $O_2$ concentration of approximately 6% v/v, which may be acceptable to avoid an explosion risk.

It is also preferred that the offgas is injected so that the gas inside the material hopper has an $O_2$ concentration of less than 4.5% v/v when the lower seal valve is opened. The respective $O_2$ concentration may be even lower, e.g. less than 3% v/v.

The flammability limits based on the volume percent of hydrogen in air at 101 kPa (1 atm) are 4.0 and 75.0. The flammability limits based on the volume percent of hydrogen in oxygen at 101 kPa are 4.0 and 94.0. The limits of detonability of hydrogen in air are 18.3 to 59 percent by volume. Flames in and around a collection of pipes or structures can create turbulence that causes a deflagration to evolve into a detonation, even in the absence of gross confinement.

The method can in particular be employed if the blast furnace is operated with a fuel like coke oven gas that is used as a reducing gas for the iron ore. As explained above, this leads to a significant $H_2$ concentration in the blast furnace gas. In such an embodiment, after opening the lower seal valve, the gas inside the material hopper at least partially mixes with the blast furnace gas from the blast furnace having an $H_2$ concentration of at least 5% v/v. In this context, "the gas inside the material hopper" could also be referred to as "the atmosphere inside the material hopper." The $H_2$ concentration of the blast furnace gas could be even higher, e.g. at least 7% v/v. It will be understood that by opening the lower seal valve, the barrier between the gas inside the material hopper and the blast furnace gas is removed and the two gases will at least partially mix with each other. If an $H_2$ concentration of at least 5% v/v is combined with an atmosphere containing at least 4.5% v/v oxygen, this may at least lead to a combustible mixture or even an explosive mixture. If, however, the gas inside the material hopper is inertized in the inventive manner, formation of a combustible or even explosive mixture can be suppressed.

As explained above, the offgas is the result of a combustion inside the hot stove which normally consumes a major part of the oxygen that was present before the combustion. Preferably, the offgas has an $O_2$ concentration of less than 2% v/v, more preferably less than 1% v/v. Under these circumstances, the offgas can be considered as practically oxygen-free, wherefore the material hopper can be effectively inertized if a sufficient portion of the gas inside is replaced with offgas.

It is preferred that after closing the upper valve and before opening the lower seal valve, an overpressure is generated inside the material hopper. In this context, "overpressure" refers to a pressure that is above the atmospheric pressure around the blast furnace plant. Normally, there is also an overpressure inside the blast furnace, wherefore a significant amount of blast furnace gas would enter the material hopper if it was under ambient pressure. The overpressure can be set to a value that is slightly above the pressure inside the blast furnace, e.g. about 0 mbar to 100 mbar or higher. In particular, this overpressure can be generated by injecting the offgas with an elevated pressure or by using an other pressurized gas.

There are various options as to when exactly the offgas is injected into the material hopper. According to one possibility, a part of the offgas is injected before the raw materials are introduced into the material hopper. At this stage, the gas inside the material hopper may contain air as well as offgas and blast furnace gas from the previous charging cycle. It is particularly desirable to expel at least most of the blast furnace gas before fresh raw materials are introduced, since this also introduces air into the material hopper. In this embodiment, the material hopper may be "flushed" with offgas before fresh raw materials are introduced. "A part" means that at least a portion or a fraction of the entire offgas that is injected during one charging cycle is injected before the raw materials are introduced into the material hopper.

Typically, the concentration of blast furnace gas in the material hopper is highest near the lower seal valve, since this is the region that is closest to the blast furnace. In order to successfully remove or at least dilute the blast furnace gas in the material hopper, the offgas can advantageously be injected in this area. In particular, a part of the offgas is injected between the lower seal valve and a lower material gate. The lower material gate is normally used to regulate a material flow from the material hopper to the blast furnace. It may also be referred to as a material flow regulating gate or the like. It is normally disposed within the material hopper with respect to the lower seal valve, i.e. upstream from the lower seal valve.

Alternatively or additionally to an injection before the raw materials are introduced into the material hopper, a part of the offgas may be injected while the raw materials are introduced into the material hopper. By this measure, the amount of ambient air that is introduced together with the raw materials can be reduced. In this embodiment, the offgas may be injected in an upper portion of the material hopper, e.g. at or near the upper seal valve.

As already described above, each hot stove alternatingly undergoes a heating phase, in which it is heated by a combustion that produces the offgas, and a blowing phase, in which it produces hot blast. According to a preferred embodiment, offgas is collected from the hot stove after the start of a heating phase and before the start of the following blowing phase. In other words, collection of the offgas is synchronised with the heating and blowing phase of the respective hot stove. Collecting the offgas is stopped before the blowing phase starts, thereby avoiding the risk of collecting cold blast or hot blast from the hot stove instead of offgas. It will be understood that even transferring small amounts of cold or hot blast to the material hopper could significantly impair the inertization.

The transfer system, i.e. the system to transfer the offgas from the hot stove(s) to the material hopper(s), may comprise a collecting pipe for each hot stove, a discharge pipe for each material hopper and an intermediate portion connecting each collecting pipe to each discharge pipe. Each collecting pipe is connected to a hot stove and to the intermediate portion. One could also say that offgas from all hot stoves is gathered at the intermediate portion. At the intermediate portion, the offgas may be temporarily stored and—if necessary—prepared for further transfer to the at least one material hopper. A discharge pipe leads from the intermediate portion to each material hopper, i.e. there is one discharge pipe for each material hopper. Accordingly, the offgas is transferred from a hot stove through a collecting pipe, the intermediate portion and a discharge pipe to a material hopper.

Preferably, the offgas collected from a hot stove is cooled by a cooling device before it is injected into the material hopper. Such a cooling device is normally a heat exchanger. Thus, the temperature of the offgas can be lowered from an initial temperature of e.g. 300° C.-400° C. to a temperature of e.g. 30° C.-80° C. Also, the heat contained in the offgas can be transferred to other media and thus be utilised, either to facilitate processes in the blast furnace plant or outside thereof. Cooling the offgas can e.g. prevent heat damage to the material hopper. Also, even if a combustible gas mixture is formed in the material hopper, e.g. locally and temporarily, the risk of igniting such a mixture is reduced if the overall temperatures in the material hopper are reduced. Normally, the offgas is cooled while it is transferred in the transfer system from the hot stove to the material hopper. For instance, the abovementioned intermediate portion may comprise the cooling device, so that a single cooling device can be used to cool the offgas from every hot stove.

In an embodiment, the offgas could be transferred from the hot stove(s) to the material hopper(s) passively, i.e. following a pressure difference. However, such passive transfer may be ineffective and lead to an unpredictable offgas supply. It is therefore preferred that the offgas is propelled through the transfer system by a blower unit. The blower unit may be integrated into the above-mentioned intermediate portion of the transfer system. It may comprise one or several blowers. Preferably, a flowrate of the offgas is adapted by controlling an output of the at least one blower. Each blower may have a variable speed drive. The blowers may be arranged in parallel, i.e. the intermediate portion may comprise a plurality of blower pipes that are parallel with respect to the flow of the offgas, wherein each blower pipe comprises one blower. The parallel arrangement of the blower increases the operational safety due to redundancy and allows to reach higher gas flow rates. A recirculation bypass line is added to each blower to improve its response behaviour to changing load points. Thus, the blower works in a continuous operation and the adaption to different load points is performed by the recirculation bypass line.

If the blast furnace plant comprises a plurality of material hoppers, the charging cycles of different material hoppers are normally not performed simultaneously. Therefore, the offgas is usually only needed at one material hopper at a time. It is therefore preferred that the offgas is directed selectively to at least one of a plurality of material hoppers by a distribution valve unit. The distribution valve unit may comprise one or a plurality of valves, which may be disposed in different discharge pipes. For instance, if there are two discharge pipes, the offgas can be directed to one material hopper by closing the valve(s) in the discharge pipe of the other material hopper. Apart from this, each discharge pipe may comprise a check valve by which an unwanted backflow of the offgas is prevented.

The disclosure also provides a blast furnace plant that comprises a blast furnace, at least one material hopper for charging raw materials to the blast furnace, having an upper seal valve and a lower seal valve, and at least one hot stove adapted to produce hot blast for the blast furnace. The blast furnace plant is adapted to perform at least one charging cycle with the following steps: opening the upper seal valve, introducing raw materials into the material hopper, closing the upper seal valve, pressure equalization of the material hopper with blast furnace top pressure and opening the lower seal valve to discharge raw materials into the blast furnace. The blast furnace plant further comprises a transfer system that is adapted to transfer an offgas from the at least one hot stove to the at least one material hopper, and the blast furnace plant is adapted to inject the offgas into the material hopper before the lower seal valve is opened. In other words, the disclosure refers to a blast furnace plant comprising a blast furnace and at least one material hopper for charging, respectively introducing, raw materials into the blast furnace. The (material) hopper comprises an upper seal valve and a lower seal valve. At least one hot stove (is configured for) producing hot blast for (being introduced into) the blast furnace. The blast furnace plant is configured for performing, respectively performs, at least one charging cycle, wherein the charging cycle comprises the (subsequently following) steps of: opening the upper seal valve, introducing raw materials into the material hopper through the upper seal valve, closing the upper seal valve, performing a pressure equalization of the material hopper with blast furnace top pressure, and opening the lower seal valve to discharge raw materials into the blast furnace. The blast furnace plant comprises further a transfer system (configured for) transferring an offgas from the at least one hot stove to the at least one material hopper, wherein the blast furnace plant is configured for injecting the offgas into the material hopper. The material hopper is pressurized, respectively pressurizable, to the blast furnace top pressure before the lower seal valve is opened and the raw materials are discharged into the blast furnace. It should be noted thatthe embodiments and effects explained in relation with the method according to the disclosure also apply to the blast furnace plant according to the disclosure. In an embodiment, the upper seal valve of the hopper is configured for sealingly closing an upper opening of the hopper, and the lower seal valve is configured for sealingly closing a lower opening of the hopper, wherein the hopper further comprises a material gate disposed above the lower seal valve. “Seal valve” generally refers to a sealing mechanism configured for sealing a pressurized (gas) volume against an adjacent environment. “Material gate” refers to an open- and closable device for regulating/controlling the passage (as well as the amount) of the material introduced into the (blast) furnace. This arrangement allows that the offgas may be at least partially injected between the lower seal valve and a lower material gate.

All these terms have been explained with reference to the inventive method and therefore will not be explained again. Preferred embodiments of the inventive blast furnace correspond to those of the inventive method.

BRIEF DESCRIPTION OF THE DRAWINGS

Preferred embodiments of the disclosure will now be described, by way of example, with reference to the accompanying drawings, in which.

DETAILED DESCRIPTION

Figure 1:
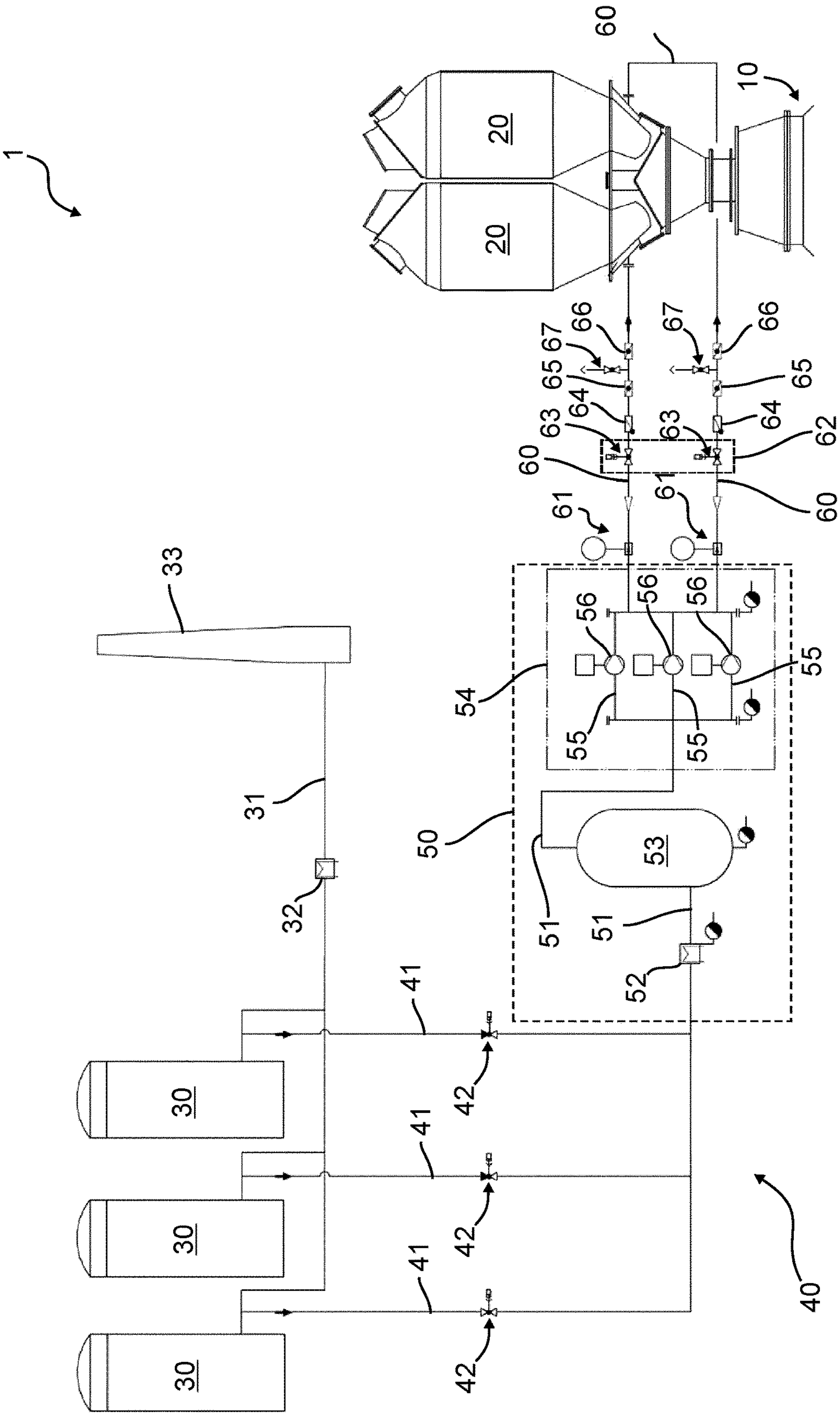
FIG. 1 is a schematic view of an inventive blast furnace plant.
Figure 2:
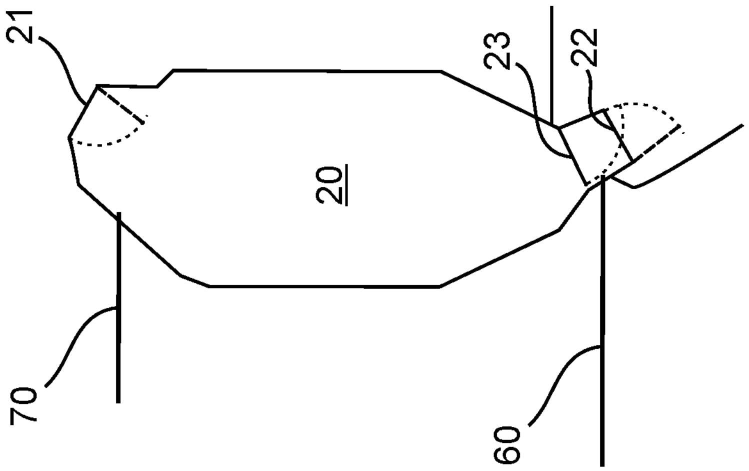
FIG. 2 is a schematic sectional view of a portion of the blast furnace plant from FIG. 1.

FIG. 1 shows a schematic representation of an inventive blast furnace plant 1 that is adapted for an inventive method. It comprises a blast furnace 10, the general operation of which is known in the art and therefore will not be explained here. Two material hoppers 20, one of which is shown schematically in FIG. 2, are disposed above the top of the blast furnace 10. Each material hopper 20 comprises an upper seal valve 21 for sealingly closing an upper opening, a lower seal valve 22 for sealingly closing a lower opening and a material gate 23 disposed above the lower seal valve 22. During operation, each of the material hoppers 20 receives the raw materials for the blast furnace 10. For instance, one material hopper 20 may receive iron ore, while the other material hopper 20 receives coke. The respective raw materials are temporarily stored in the material hopper 20 before it is discharged to the blast furnace 10.

Each material hopper 20 sequentially undergoes a plurality of charging cycles. At the start of each charging cycle, the lower seal valve 22 and the material gate 23 are closed and the upper seal valve 21 is opened. Then, raw materials can be filled into the material hopper 20 through the upper seal valve 21. When a predetermined quantity of raw materials has been filled in, the upper seal valve 21 is closed to provide an air-tight seal towards the outside of the material hopper 20. Then, the pressure inside the material hopper 20 is increased until an overpressure is reached that is above the pressure inside the blast furnace 10. After that, the lower seal valve 22 is opened, whereby gas exchange between the material hopper 20 the blast furnace 10 is enabled, since even in its closed position, the material gate 23 does not provide an air-tight seal. In order to discharge raw materials to the blast furnace 10, the material gate 23 is opened to a certain degree, whereby the material flow is controlled. Finally, when all raw materials have been discharged to the blast furnace 10, the material gate 23 and the lower seal valve 22 are closed. Then, after adjusting the pressure inside the material hopper 20 to ambient pressure, the upper seal valve 21 can be opened again and new raw materials can be filled in.

In an industrial setup, semi-clean BF gas is often injected in a first step in the material hopper, which brings it to a pressure of BF gas—0.15 bar; this is called primary equalizing and afterwards hot blast stove off gas is injected to bring the hopper to BF top pressure (similar to secondary equalizing, normally done with nitrogen).

Generally speaking, some component of the blast furnace gas could form a combustible/flammable or explosive mixture with the oxygen in the ambient air. In particular, the blast furnace gas could comprise a considerable concentration of $H_2$, e.g. at least 7% v/v, which combine with $O_2$ to form a flammable mixture. In order to minimize or eliminate this problem, an offgas is injected into the material hopper 20 at certain stages of the charging cycle as will be discussed in the following. The offgas has an $O_2$ concentration of less than 2% v/v and therefore can be largely regarded as an inert gas. The offgas is collected from a plurality of hot stoves 30, which are generally used to supply hot blast for the blast furnace 10. Each hot stove 30 alternatingly undergoes a heating phase, in which it is heated by a combustion that produces the offgas, and a blowing phase, in which it produces hot blast. The hot stove 30 is lined with checker bricks that temporarily store heat from the combustion. When the offgas inside the hot stove 30 is replaced with cold blast (i.e. air or another oxygen-containing gas with ambient temperature), heat is transferred to the cold blast, whereby hot blast is produced. A suitable fuel gas for the combustion can be introduced into the hot stove 30 by a supply pipe that is not shown for sake of simplicity. The same applies to a cold blast pipe for supplying cold blast and a hot blast pipe for transferring hot blast from the hot stove 30 to the blast furnace 10.

The offgas is partially transferred through an offgas pipe 31 to a chimney 33, from where it is released to the environment. Some of the internal heat of the offgas, which may initially have a temperature between 300° C. and 400° C., is recuperated by a first heat exchanger 32 in the offgas pipe 31. Another portion of the offgas is a transferred to the material hoppers 20 by a transfer system 40, which is described in detail in the following. A collecting pipe 41 originates from each of the hot stoves 30. The gas flow through the respective collecting pipe 41 can be controlled by a control valve 42. The control valve 42 is operated so that offgas is only collected from the hot stove 30 when it is in a heating phase, whereas no gas is collected from the hot stove 30 when it is in a blowing phase, thereby avoiding introduction of oxygen-rich gas is into the transfer system 40. Each collecting pipe 41 is connected to an intermediate portion 50 of the transfer system 40, or more specifically, to an intermediate pipe 51. In a second heat exchanger 52, the internal heat of the offgas is recuperated and it is cooled down to a temperature of e.g. 45°. Downstream of the second heat exchanger 52, the offgas reaches a reservoir 53, which is used to smooth the gas flow and condensate a part of the residue moisture in the gas, where it can be temporarily stored. Then, the intermediate pipe 51 reaches a blower section 54, where it branches into three blower pipes 55. Each blower pipe 55 comprises a blower 56, by which the offgas is propelled through the transfer system 40. The output of each blower 56 can be adjusted in order to adapt the flow rate of the offgas.

The intermediate portion 50 is connected to two discharge pipes 60, each of which is connected to one of the material hoppers 20. Each discharge pipe 60 comprises a flow meter 61 by which the gas flow can be monitored. In particular, information from the gas flow meter 61 can be used to adequately control the blowers 56. A distribution valve unit 62 comprises two control valves 63, namely one in each discharge pipe 60. The distribution valve unit 62 adjusts the gas flow and may in particular block the gas flow through one discharge pipe 60 in a situation where no offgas needs to be injected into the corresponding material hopper 20. Furthermore, each distribution line 60 comprises a check valve 64, a relief pipe 67 and two shut-off valves 65, 66 disposed upstream and downstream of the relief pipe 67. E.g. for maintenance purposes, gas can be released from the discharge pipe 60 through the relief pipe 67. The shut-off valves 65, 66 can be used to isolate one part of the transfer system 40 before the relief pipe 67 is opened.

As shown in the sectional view of FIG. 2, the discharge pipe 60 enters the material hopper 20 between the lower seal valve 22 and the material gate 23. When all raw materials have been discharged to the blast furnace 10, the lower seal valve 22 and the material gate 23 are closed as described above. However, the material gate 23 does not provide an air-tight seal with respect to the rest of the material hopper 20. Now, before the upper seal valve 21 is opened, offgas is injected through the discharge pipe 60, so that possibly remaining $H_2$ from the blast furnace gas is expelled from the lower part of the material hopper 20. It is possible to continue injection until at least 90% v/v of the gas inside the material hopper 20 has been replaced by offgas. The gas previously contained in the material hopper 20 can be released through a relief valve (not shown). Then, raw materials can be introduced through the upper seal valve 21 as described above. At this point, the $H_2$ concentration inside the material hopper 20 is negligible, wherefore no explosive mixture can form. However, ambient air is introduced together with the raw materials, thereby introducing considerable amounts of $O_2$ into the material hopper 20. This could potentially pose an explosion risk when the lower seal valve 22 is reopened. This risk can be avoided in various ways. For instance, after the raw materials have been introduced, offgas injection through the discharge pipe 60 can be continued in order to displace $O_2$ at least from the lower part of the material hopper. Alternatively or additionally, an additional discharge pipe 70 may be provided, which is disposed to inject offgas into an upper portion of the material hopper 20 near the upper seal valve 21. Through this discharge pipe 70, offgas can be injected while the raw materials are introduced. Thus, the ambient air around the raw materials will be significantly diluted. Thus, the $O_2$ concentration in the material hopper can be reduced to e.g. less than 5% v/v.

The invention claimed is:

1. A method for operating a blast furnace plant that comprises a blast furnace, at least one material hopper for charging raw materials to the blast furnace, having an upper seal valve and a lower seal valve, and at least one hot stove that produces hot blast for the blast furnace, the method comprising at least one charging cycle with the following steps:

opening the upper seal valve, introducing raw materials into the material hopper, closing the upper seal valve, pressure equalization of the material hopper with blast furnace top pressure, and opening the lower seal valve to discharge the raw materials into the blast furnace, wherein an offgas from the at least one hot stove is transferred by a transfer system to the at least one material hopper and the offgas is injected into the material hopper and the material hopper is pressurized to blast furnace top pressure before the lower seal valve is opened and the raw materials are discharged into the blast furnace, wherein the offgas is injected to constitute at least 70% v/v of a gas inside the material hopper when the lower seal valve is opened.

2. The method according to claim 1, wherein the offgas is injected so that the gas inside the at least one material hopper has an $O_2$ concentration of less than 4.5% v/v when the lower seal valve is opened.

3. The method according to claim 1, wherein after opening the lower seal valve, a gas inside the at least one material hopper at least partially mixes with a blast furnace gas from the blast furnace having an $H_2$ concentration of at least 5% v/v.

4. The method according to claim 1, wherein the offgas has an $O_2$ concentration of less than 2% v/v.

5. The method according to claim 1, wherein after closing the upper seal valve and before opening the lower seal valve, an overpressure is generated inside the at least one material hopper.

6. The method according to claim 1, wherein the offgas is at least partially injected before the raw materials are introduced into the at least one material hopper.

7. The method according to claim 1, wherein the offgas is at least partially injected between the lower seal valve and a lower material gate.

8. The method according to claim 1, wherein the offgas is at least partially injected while the raw materials are introduced into the at least one material hopper.

9. The method according to claim 1, wherein the the at least one hot stove alternatingly undergoes a heating phase, in which it is heated by a combustion that produces the offgas, and a blowing phase, in which it produces hot blast, and the offgas is collected from the hot stove after the end of a heating phase and before the start of the following blowing phase.

10. The method according to claim 1, wherein the transfer system comprises a collecting pipe for each of the at least one hot stove, a discharge pipe for each of the at least one material hopper and an intermediate portion connecting each collecting pipe to each discharge pipe.

11. The method according to claim 1, wherein the offgas collected from a hot stove is cooled by a cooling device before it is injected into the material hopper.

12. The method according to claim 1, wherein the offgas is propelled through the transfer system by a blower unit.

13. The method according to claim 1, wherein the offgas is directed selectively to the at least one material hopper by a distribution valve unit.

14. A blast furnace plant, comprising:

a blast furnace, the at least one material hopper for charging raw materials to the blast furnace, having an upper seal valve and a lower seal valve, at least one hot stove adapted to produce hot blast for the blast furnace, and a transfer system adapted to transfer an offgas from the at least one hot stove to the at least one material hopper, wherein the blast furnace plant is adapted to inject the offgas into the at least one material hopper and perform at least one charging cycle as defined in claim 1.

* * * * *